June 27, 1939.  C. E. COOK  2,163,935
DEVICE FOR FABRICATING DETACHABLE DRILL BITS
Filed Sept. 23, 1937
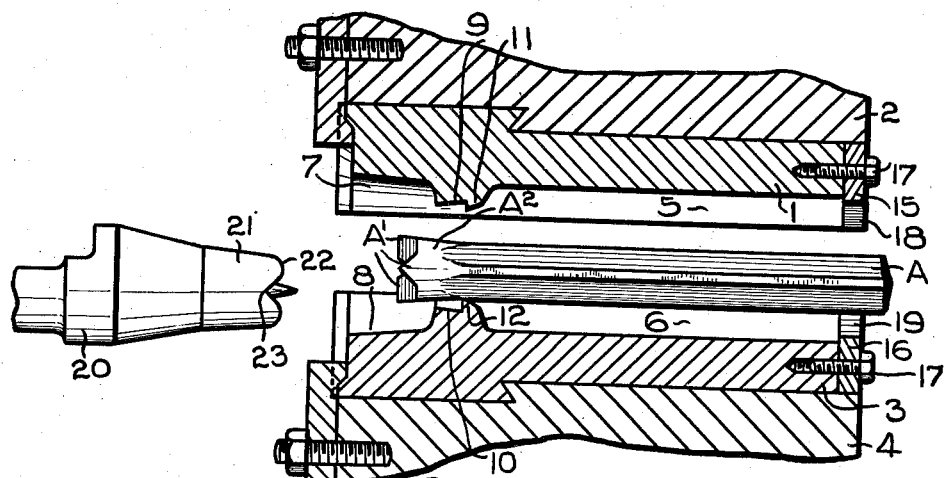
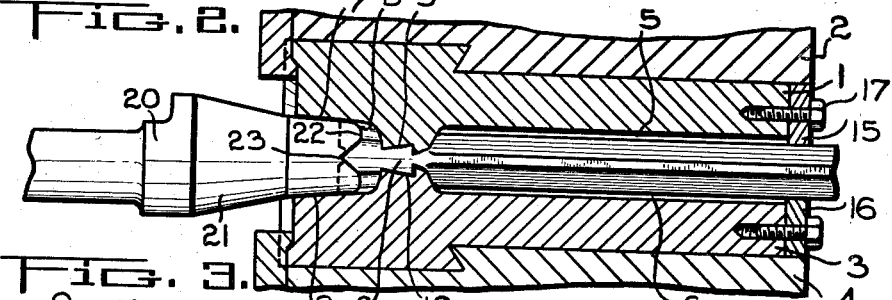
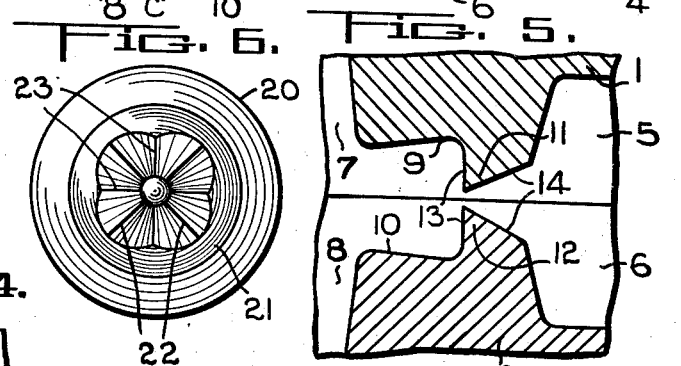
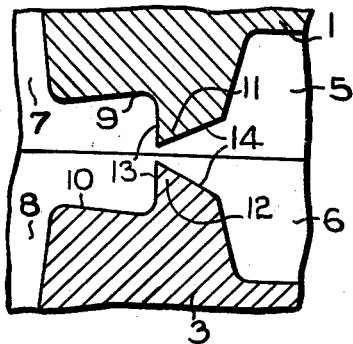
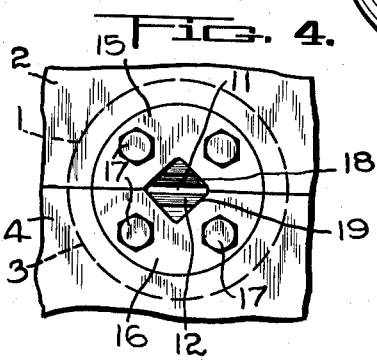
Inventor
C. E. COOK
By
J.E.M. Fetherstonhaugh
Attorney Patented June 27, 1939

2,163,935

UNITED STATES PATENT OFFICE 2,163,935

DEVICE FOR FABRICATING DETACHABLE DRILL BITS

Charles Edward Cook, South Porcupine, Ontario, Canada, assignor to International Detachable Bits & Equipment, Limited, Timmins, Ontario, Canada, a corporation of Ontario, Canada Application September 23, 1937, Serial No. 165,243

1 Claim. (Cl. 76—95)

My invention relates to improvements in devices for fabricating detachable drill bits and an object of the invention is to devise means for carrying out the method described and claimed in my co-pending application Serial No. 165,242 filed September 23, 1937, improvements in Methods for fabricating detachable drill bits.

With the above and other objects in view which will hereinafter appear as the specification proceeds my invention consists, in its preferred embodiment, of the construction and arrangement all as hereinafter more particularly described and illustrated in the accompanying drawing in which:

Fig. 1 is a vertical longitudinal section through the divided combined forming and clamping die of my device showing the upper portion retracted and a drill steel stock in position in the die, a dolly for dollying the end of the detachable drill bit formed from the stock being shown in elevation in the inoperative position.

Fig. 2 is a similar view to Fig. 1 only showing the die closed about the stock and the detachable drill bit formed and being dollied by the dolly.

Fig. 3 is an end view of the die viewed from the dolly receiving end.

Fig. 4 is an end view of the die viewed from the opposite end.

Fig. 5 is an enlarged fragmentary vertical longitudinal section through coacting portions of the die showing the means for partially shearing through the stock, and Fig. 6 is an enlarged end view of the dolly.

Like characters of reference indicate corresponding parts in the different views of the drawing.

My device comprises a divided combined forming and clamping die having its upper or movable portion 1 mounted on the ram 2 of a conventional drill steel sharpener and its lower or stationary portion 3 mounted on the lower die block 4 of such sharpener.

An axial bore extends through the die from the end remote from the dollying end, such bore being formed by registering recesses 5 and 6 in the coacting faces of the portions 1 and 3.

In the dollying end of the die a conical axial recess is formed by registering recesses 7 and 8 in the coacting faces of the portions 1 and 3, and in the case where the detachable drill bits to be formed are to have dovetail tongues for connection to a shank a recess of dovetail cross-section extends inwardly into the die from the conical recess and is formed by the registering recesses 9 and 10 in the coacting faces of the portions 1 and 3.

In order to partially shear the detachable drill bit from the stock from which it is formed in the die, the latter is provided on the coacting faces of its portions 1 and 3 with opposed knives 11 and 12, the vertical edge 13 of each knife constituting the end wall of the dovetail recess and the other edge 14 of each knife being disposed at a diverging angle to the longitudinal axis of the die.

To ensure the proper alignment of the drill steel stock in the die, I provide semi-circular plates 15 and 16 attached to the ends of the portions 1 and 3 remote from the end provided with the conical recess by the screw bolts 17. Such plates have respectively notches 18 and 19 in their coacting faces which together form an aperture of the cross-sectional shape of the drill steel stock inserted into the die and support it in its proper position.

The dolly 20 provided with a conical nose 21 adapted to be received into the conical recess of the die is mounted in the dolly attachment (not shown) of the drill steel sharpener with its longitudinal axis coincident with that of the die. The nose 21 of the dolly has points 22 and valleys 23 corresponding to the valleys and points on the cutting surface of the detachable drill bit which it is adapted to dolly.

My device actuates as follows:

The ram 2 and the attached die portion 1 are retracted as illustrated in Fig. 1 of the drawing and the heated drill steel stock A which has previously had bit cutters $A^1$ formed on its end $A^2$ is positioned in the die with its end $A^2$ in the conical recess thereof.

The ram 2 is then brought down which brings down the attached die portion 1 so that the die is closed as illustrated in Fig. 2. This operation forms a detachable drill bit B on the end $A^2$ of the stock A complete with the dovetail tongue C due to the formation of the interior of the die, i. e. the recesses 7, 8 and 9, 10.

The knives 11 and 12 in the above operation which do not abut in closing the die partially sever the formed detachable drill bit B from the remainder of the stock A but leave a neck of reduced cross-section between the dovetail tongue C and the remainder of the stock. The construction of the knives ensures that when the bit is subsequently completely severed from the remainder of the stock the point of fracture will be immediately adjacent the end wall of the dovetail tongue C so that no machining of the latter will be necessary.

With the die still closed wherein the stock and the formed detachable drill bit is firmly clamped therein the cutters A¹ of the formed bit B are subjected to a dollying operation by the dolly 20 wherein the points 22 and 23 sharpen the cutters and the bit is gauged including the dovetail tongue C.

The ram 3 and dolly 20 are then retracted and the stock A with bit B attached is removed from the die. The bit is then struck transversely with a hand hammer which severs it completely from the remainder of the stock. After hardening the bit it is ready for use.

From the above description it will be seen that by means of my combined forming and clamping die and dolly detachable drill bits can be completely fabricated in a conventional drill steel sharpener such as employed in the steel shops of mines without the use of any expensive machines and entirely by forging operations thus effecting a saving in equipment and labour costs as well as in the consumption of metal and fuel required for heating the steel.

Although I have described and illustrated the detachable drill bit forged by my device as being of the type wherein a dovetail tongue is provided thereon for connection to a shank, by changing the interior of the die detachable drill bits of other constructions may be forged in my device.

What I claim as my invention is:

In a device for forming detachable drill bits from a drill steel stock which has previously had a bit cutter roughly formed on an end thereof, means for forming the end of the drill steel stock provided with the roughly formed bit into a detachable bit with a diametrical tongue of dovetail cross-section on the end remote from the cutter comprising a divided combined clamping and forming die between the parts of which the drill steel stock is inserted, said parts of the die having major coacting bit forming recesses including minor dovetail tongue forming recesses extending from the major recesses, and means cooperating with the above means and functioning synchronously therewith for sizing such detachable bit including the dovetail tongue and sharpening its cutter all in one pass of the drill steel stock to the cooperating means comprising a reciprocable dolly disposed coaxially with the die and insertable into the bit forming recesses therein.

CHARLES EDWARD COOK.